US005559662A

United States Patent [19]

Happ et al.

[11] Patent Number: 5,559,662

[45] Date of Patent: Sep. 24, 1996

[54] FUSED DISCONNECT SWITCH

[75] Inventors: Lawrence R. Happ, Mundelein; Conrad Alfaro, Harwood Heights, both of Ill.

[73] Assignee: Cooper Industries, Houston, Tex.

[21] Appl. No.: 246,703

[22] Filed: May 20, 1994

[51] Int. Cl.$^6$ .......... H02H 5/04

[52] U.S. Cl. .......... 361/104; 361/119; 361/124; 337/265

[58] Field of Search .......... 361/119, 124, 361/104; 337/79, 190, 265, 266, 227, 237, 239, 241, 242; 340/638, 641, 642; 324/550

[56] References Cited

U.S. PATENT DOCUMENTS

| | | | |
|---|---|---|---|
| 3,711,748 | 1/1973 | Dietz | 317/112 |
| 3,806,845 | 4/1974 | Zubaty et al. | 335/18 |
| 3,924,914 | 12/1975 | Banner | 339/14 P |
| 4,365,226 | 12/1982 | Barry et al. | 337/198 |
| 4,499,447 | 2/1985 | Greenberg | 337/266 |
| 4,654,743 | 3/1987 | Ruehl et al. | 361/111 |
| 4,692,833 | 9/1987 | Chung | 361/91 |
| 4,958,254 | 9/1990 | Kidd et al. | 361/119 |
| 5,113,169 | 5/1992 | Ruehl et al. | 337/265 |
| 5,140,115 | 8/1992 | Morris | 200/308 |
| 5,390,065 | 2/1995 | Allina et al. | 361/56 |

FOREIGN PATENT DOCUMENTS

| | | |
|---|---|---|
| 687673 | 6/1964 | Canada . |
| 1624556 | 1/1991 | U.S.S.R. . |

*Primary Examiner*—Todd DeBoer

*Attorney, Agent, or Firm*—Burns, Doane, Swecker & Mathis, L.L.P.

[57] ABSTRACT

A fused disconnect switch including a plurality of maintenance and installation enhancing features is disclosed. For example, a bipolar LED is provided as an alarm indicator so that the fused disconnect switch will function in power distribution systems which operate on both positive and negative voltages. Additionally, a manual test tab is provided for checking the alarm circuitry and a viewing window is provided so that the presence or absence of a fuse in the fused disconnect device can be ascertained without removing the fuse holder.

14 Claims, 5 Drawing Sheets

FIG. 2
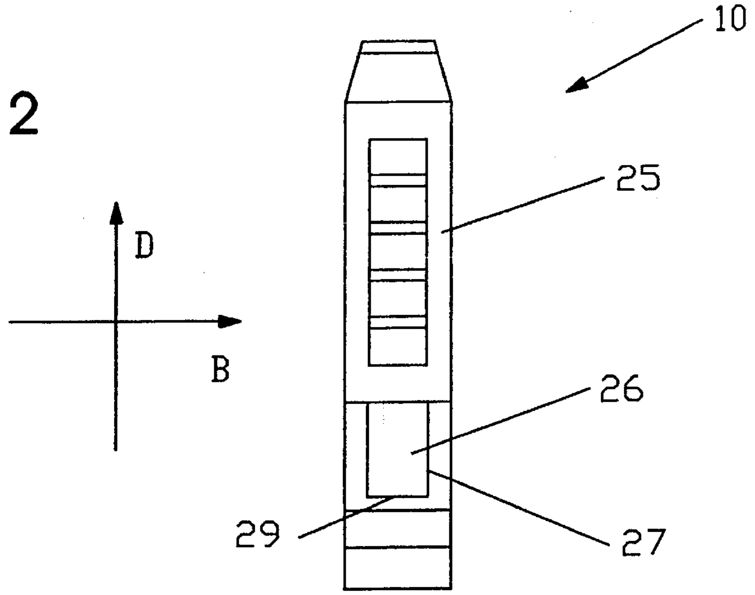
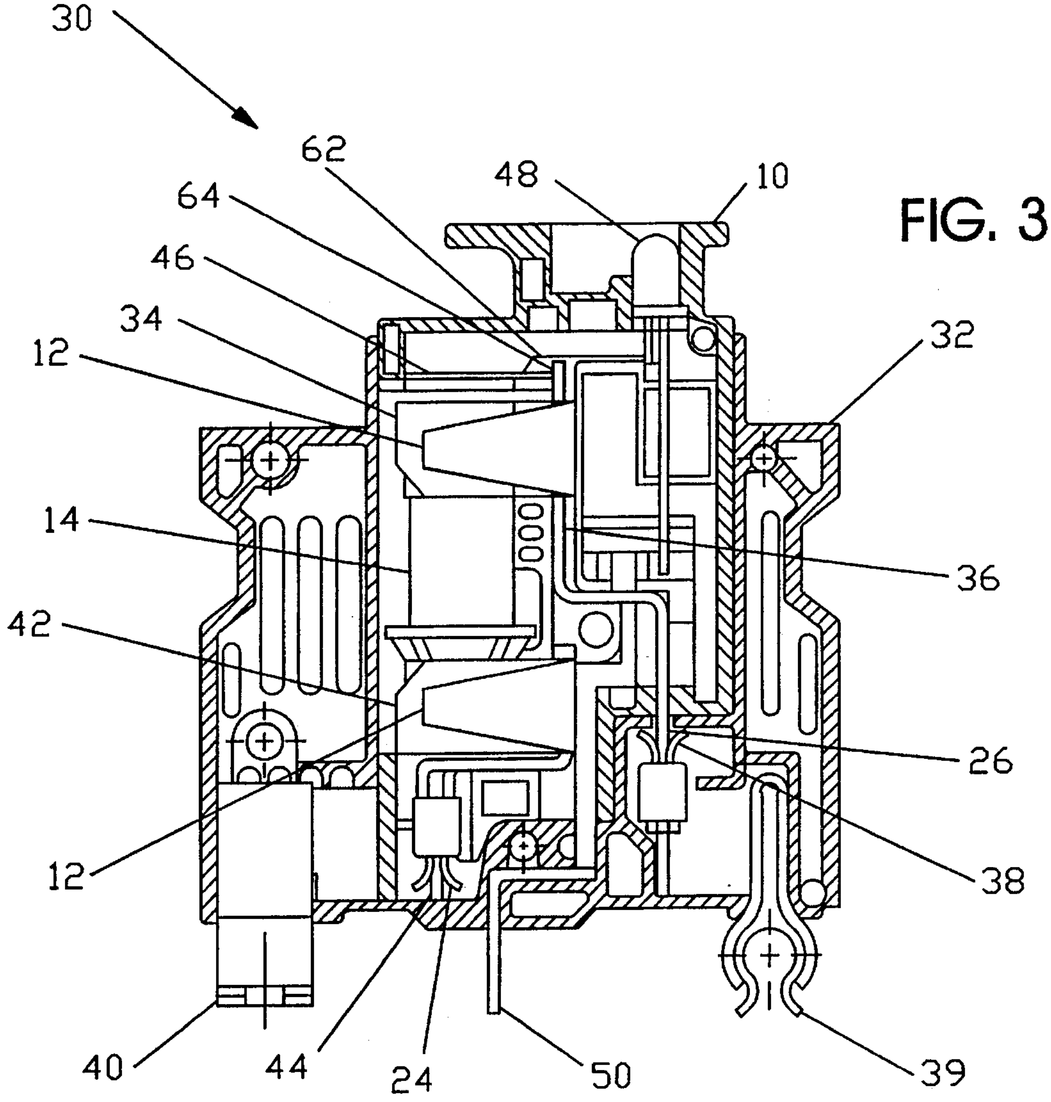
FIG. 3

FUSED DISCONNECT SWITCH

BACKGROUND

The present invention relates to low voltage, high current electrical power distribution systems and, more particularly, to fuse protected electrical disconnect devices for use in power distribution systems.

A common problem in various industries, for example the telecommunications industry, is the distribution of relatively low voltage, relatively high current electrical power to the various devices and equipment which require such power. Telecommunications system plants, such as telephone switching offices, are typically centralized and are, therefore, constructed on a large scale to serve many customers. Since telephone systems must be highly reliable, such plants usually have a plurality of high-capacity storage batteries to provide electrical power for operating equipment whenever power is not available from conventional sources. Often, the batteries are connected in parallel with suitable power conversion equipment which receives electrical power (typically high-voltage AC) from the commercial electrical utility and supplies converted power (low-voltage DC) for operating all equipment and for maintaining the batteries in a charge condition. Whenever power from these conventional sources becomes unavailable, power is immediately and automatically supplied from the batteries.

In such systems, several batteries and power converters are usually connected together so that large amounts of equipment are supplied with power from a large collection of power sources. It is desirable in such systems to be capable of isolating individual pieces of equipment, or small groups thereof, from the power supply to perform maintenance and installation activities. It is also desirable to provide overload protection for equipment on an individual basis. Accordingly, power is conventionally distributed to equipment from distribution panels having a plurality of individual fused disconnect devices. Each disconnect device controls power to a relatively small load—for example, a cabinet containing subscriber loop interface circuits for 100 subscribers and drawing 10-50 A in normal operation.

In the past, several fused disconnect devices have been developed to allow manual control of each load circuit and to provide overload and fault protection of each load circuit. Such devices have typically included a line side terminal for a wired connection to a power supply bus, a load side terminal for a wired connection to a load device, a housing and a removable fuse-containing holder which, when installed in the housing, provides an electrical connection between the line side terminal and the load side terminal.

Such conventional fused disconnect devices suffered from a plethora of drawbacks and limitations. For example, some of these disconnect devices suffered from an inability to test the alarm circuit while the fused disconnect device was in its operative position, i.e., when the fuse holder was inserted into the housing and the device was connected to both the load and line buses. Moreover, as more and more of these disconnect devices are used in remote sites which are not easily accessible and do not have proper lighting, it would be desirable to make the results of such an alarm test more readily ascertainable in a low-light environment.

Yet another problem with conventional fused disconnect devices is the inability to determine whether or not a fuse is actually provided in the removable fuse holder. In typical telecommunications power distribution systems, the fused disconnect devices are assembled in rows of approximately 10–20 units. However, not all of these units will necessarily be operational at any given time and units which are not operational will not have a fuse in the fuse holder. Since the removal of a fused disconnect switch from a functioning distribution unit would temporarily interrupt service, e.g., telephone service to a customer, it would be advantageous to provide a method for determining whether or not a fuse was provided in the disconnect switch without removing the fuse holder or the disconnect switch itself.

Additionally, fused disconnect devices, and other types of circuit breakers generally, have been plagued with difficulties in attachment to their intended line and load devices and the internal attachment between the housing or base unit and the removable fuse holder. Many such switch devices require, for example, adapters in order to be able to connect the switch device to the intended bus structure. Such adapters are both expensive, time consuming to use and add an additional connection to the circuit which reduces the overall system reliability. Accordingly, it would be desirable to provide a fused disconnect device which did not require any adapters and which could be readily connected to an intended bus structure with a minimum of installation effort. Further, it would be desirable to provide a removable fuse holder with an uncomplicated electrical and physical connection structure that nonetheless provided a secure connection with the base unit.

Another drawback associated with conventional telecommunication power distribution systems is the tendency to distribute power via individual bus bars and using individual load circuit protection devices. Individualizing all of these components is not cost effective and requires additional connection points which increases the number of potential points for system failure.

SUMMARY

These and other drawbacks, problems and limitations of conventional fused disconnect devices are overcome according to exemplary embodiments of the present invention which provide, among other features, an LED to give a visual indication of an alarm signal for a blown fuse in the disconnect switch which is readily visible even in a low-light environment. Since telecommunication switch equipment operates with both positive and negative DC voltages, a bipolar LED can be used to consolidate manufacturing into one product rather than having two products each with an LED of different polarity.

Moreover, since alarm circuitry needs to be tested to assure that all parts of the alarm circuit are functional, exemplary embodiments of the present invention provide a small opening on the top surface of the disconnect switch which can be probed manually during field operation. A metal tab located behind the opening deflects when the probe pushes against it and makes contact with the alarm circuitry to activate the LED and send an alarm signal to the monitoring station.

Yet another feature of exemplary embodiments of the present invention is the provision of a viewing window by way of which the presence or absence of a fuse in the fuse holder can be visually determined without removing the fuse holder or the disconnect switch. In this way, power distribution will not be interrupted by a maintenance worker's field check of the disconnect switch fuse. According to some exemplary embodiments, a light pipe can be provided to improve the viewing angle of the fuse through the viewing window and to assist in low-light environments.

According to another exemplary embodiment of the present invention, a removable fuse holder includes a line side connection terminal which comprises a blade which is generally parallel to a plane which can include, for example, a side of the fuse holder. Among other benefits attributable to this line side connection configuration, the removable fuse holder can be more easily disconnected from the base unit.

Moreover, this configuration also lends itself to the provision of plural removable fuse holders which are removably connected with a base unit and which share a common line bus and alarm bus. By sharing line and alarm connections, exemplary embodiments of the present invention reduce the number of connections and expense associated with fused disconnect devices.

BRIEF DESCRIPTION OF THE DRAWINGS

The foregoing, and other, objects, features and advantages of the present invention will be more readily understood upon reading the following detailed description in conjunction with the drawings in which:

FIG. 2 depicts a different side view of the removable fuse holder of FIG. 1;

FIG. 3 is a cutaway view of a fused disconnect switch according to an exemplary embodiment of the present invention;

DETAILED DESCRIPTION

Figure 1:
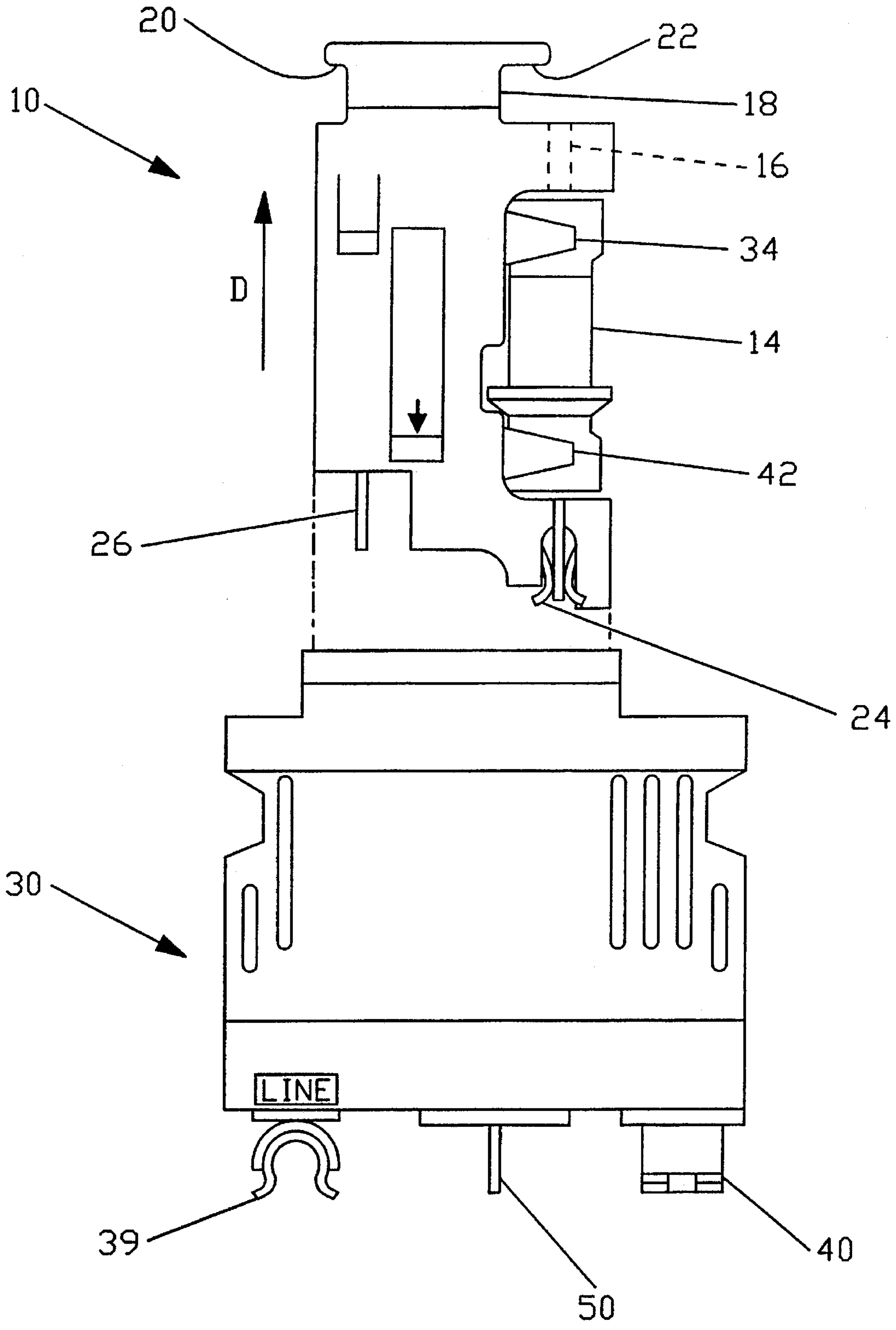
FIG. 1 illustrates a side view of a removable fuse holder and a base unit into which the removable fuse holder can be inserted according to an exemplary embodiment of the present invention.

A description of an exemplary fused disconnect switch according to the present invention begins with FIG. 1, which illustrates an exemplary removable fuse holder 10. The removable fuse holder 10 has fuseclips 34 and 42 for holding a fuse 14 in place and conducting current therethrough. The presence or absence of the fuse 14 can be readily determined using viewing window 16 (shown in hidden lines in FIG. 1) even when the removable fuse holder 10 is inserted into the base unit as shown and described below.

The removable fuse holder 10 has a handle portion 18 with areas 20 and 22 which are designed for gripping. This permits easy removal of the fuse holder 10 from the base unit in removal direction D. Removable fuse holder 10 also has a load contact 24 and blade line contact 26 which can be inserted into mating contacts in the base unit as described below. As can be seen in FIG. 1, a lengthwise dimension of blade contact 26 is roughly parallel to removal direction D.

FIG. 2 illustrates the removable fuse holder 10 in a side view. This view provides a perspective on the relative size and shape of blade contact 26 according to this exemplary embodiment. Moreover, it can be seen that a plane defined by the lengthwise edge 27 and widthwise edge 29 of the blade contact 26 is generally parallel to a plane defined by the removal direction arrow D and lies and a line B which is perpendicular to arrow D in the direction of a thickness of the fuse holder 10. It will be noted that, in this exemplary embodiment, the plane defined by the blade contact 26 is also generally parallel to the side 25 of the fuse holder 10, although those skilled in the art will appreciate that the configuration of the fuse holder 10 could be modified such that the side 25 is not parallel to the plane defined by blade contact 26.

FIG. 3 illustrates the entire fused disconnect device, i.e., base unit 30 and removable fuse holder 10 in its inserted position, in a sectional view in order to describe elements which are covered by the exterior housing 32. A fuse 14 is held in the removable fuse holder 10 by fuseclips 34 and 42 and retaining springs 12. Although only one fuse is illustrated in FIG. 1, those skilled in the art will readily appreciate that the base unit/fuse holder structure could be modified so that plural fuses could be provided and that this exemplary embodiment can be readily adapted to plural circuits within one base unit. As can be seen in FIG. 3, when the removable fuse holder 10 is inserted into the base unit 30, the fuse 14 is completely obscured from view making the viewing window 16 (shown in FIG. 1 and 5) useful in determining the presence or absence of fuse 14. A light pipe 17 (shown in FIG. 5) can be provided in the aperture between the fuse 14 and the top of the removable fuse holder 10 to maximize the amount of light which is reflected from the top (silvered) surface of the fuse and transmitted back to the aperture for low-light environments.

The fuse 14 is connected to the line side circuit through fuseclip 34. Fuseclip 34 is integrally formed with lead 36 which extends through the removable fuse holder 10, the end portion of which constitutes blade contact 26. The blade contact 26 fits snugly into contact 38 which is formed in the base unit 30, when the removable fuse holder 10 is inserted into the housing. A lead from contact 38 extends to the line contact 39 which is connectable to the line side bus.

Similarly, the fuse 14 is electrically connected to load terminal 40 through fuseclip 42. Fuseclip 42 extends through the removable fuse holder where it becomes contact 24 described above. A male connection piece 44 disposed in base unit 30 mates with the contact 24 when the removable fuse holder 10 is inserted into the base unit 30. The connection piece 44 then extends to load terminal 40, thereby completing the electrical connection.

Figure 4:
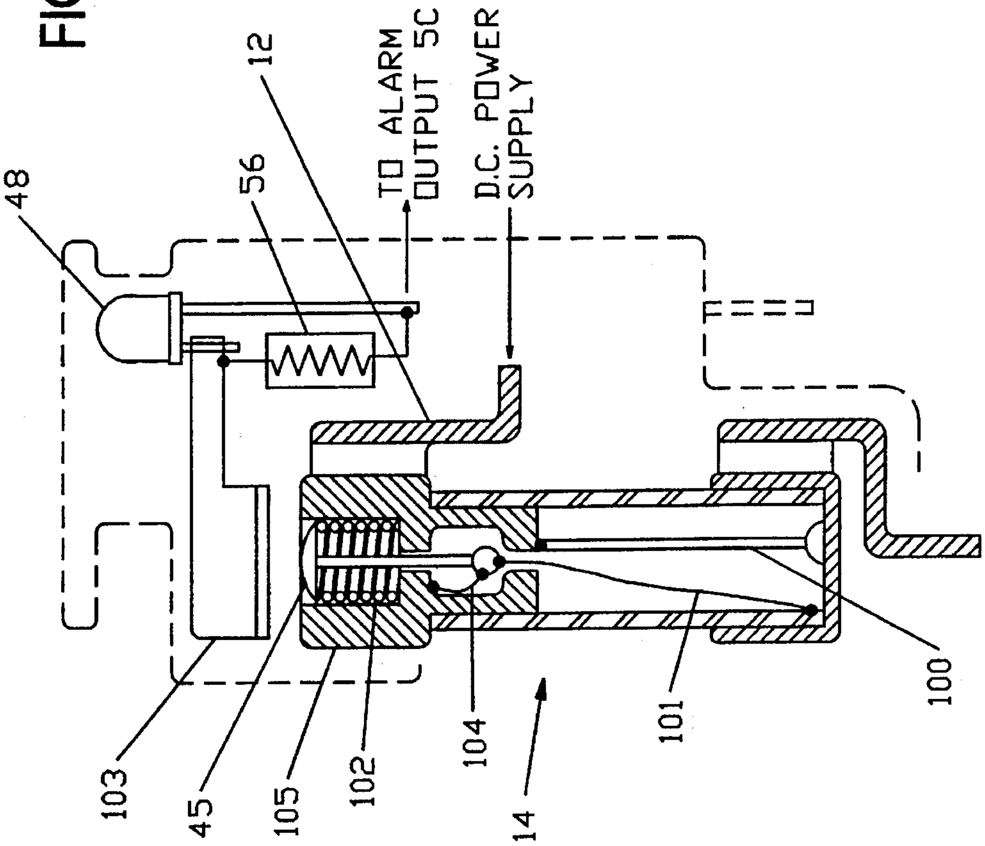
FIG. 4 is a cut away view of a removable fuse holder according to an exemplary embodiment of the present invention illustrating aspects of an alarm circuit.

The operation of the alarm circuit will now be described with respect to FIGS. 3 and 4. When the fuse 14 becomes nonconductive, i.e., the filament 100 burns out and this causes filament 101 to open. Filament 101 holds pin 45 in place against spring pressure created by spring 102. When filament 101 opens, pin 45 is pushed up toward conductive plate 103 by unconstrained spring 102. Wire 104 is electrically connected to fuse cap 105 and pin 45 such that when pin 45 contacts electrical plate 103, an electrical connection is made to fuse cap 105 through wire 104. Since fuse cap 105 is also held by line fuse clip 34, electric power from fuse clip 34 is connected to light LED 48 by pin contact 45.

The provision of a bipolar LED 48 allows, among other advantages, for fused disconnects according to the present invention to be used regardless of the polarity of the line current. Another feature of the present invention, illustrated very generally in FIG. 4, is the provision of a parallel combination of the bipolar LED and a relatively large resistor 56. In this way, should bipolar LED 48 burn out, the alarm circuit will not be broken and current will flow through the resistor 56 to produce the alarm signal at alarm output 50.

Figure 5:
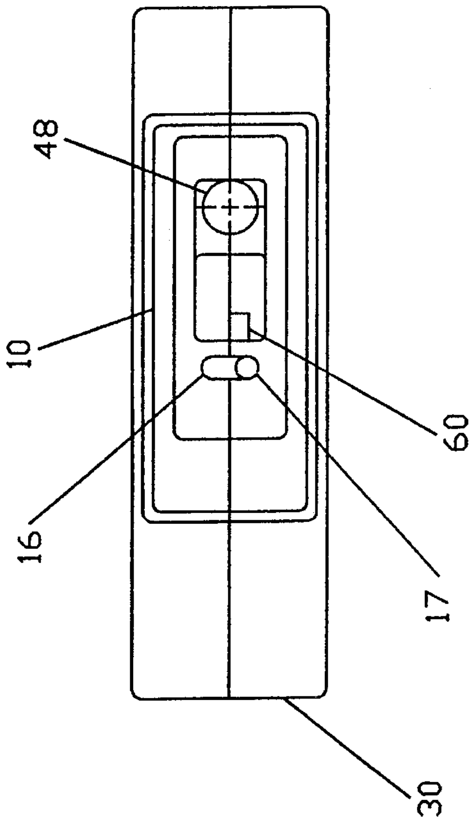
FIG. 5 is a top view of the fused disconnect switch of FIG. 3.

Exemplary embodiments of the present invention also provide a method for testing the alarm circuit manually as will now be described with respect to FIGS. 3, 4 and 5. FIG. 5 illustrates a top view of the base unit 30 with the removable fuse unit 10 inserted therein. Also visible from this perspective are the viewing window 16 and bipolar LED 48. An aperture 60 is provided in the top of the removable fuse holder 10 for probing with an elongated tool (not shown).

Looking back to FIG. 3, within the aperture 60 is a metal tab 62 which can be deflected by inserting the elongated tool therein. When deflected, the metal tab 62 contacts pin 64 which is connected to the line side and is, therefore, always hot when the fused disconnect is attached to its respective buses. When metal tab 62 contacts pin 64, the alarm circuit is completed, the LED 48 lights and an alarm signal is sent out over alarm output 50. In this way, the alarm circuit can be tested without removal of the fused disconnect and without interruption of power service to the equipment serviced by the fused disconnect.

Figure 6:
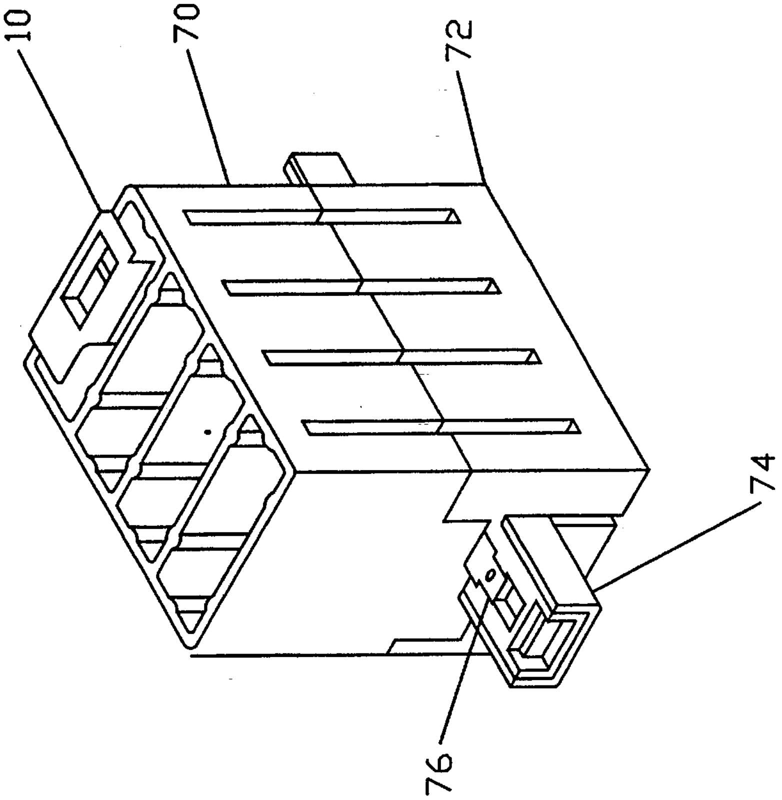
FIG. 6 is an exemplary base unit according to another embodiment of the present invention.
Figure 9:
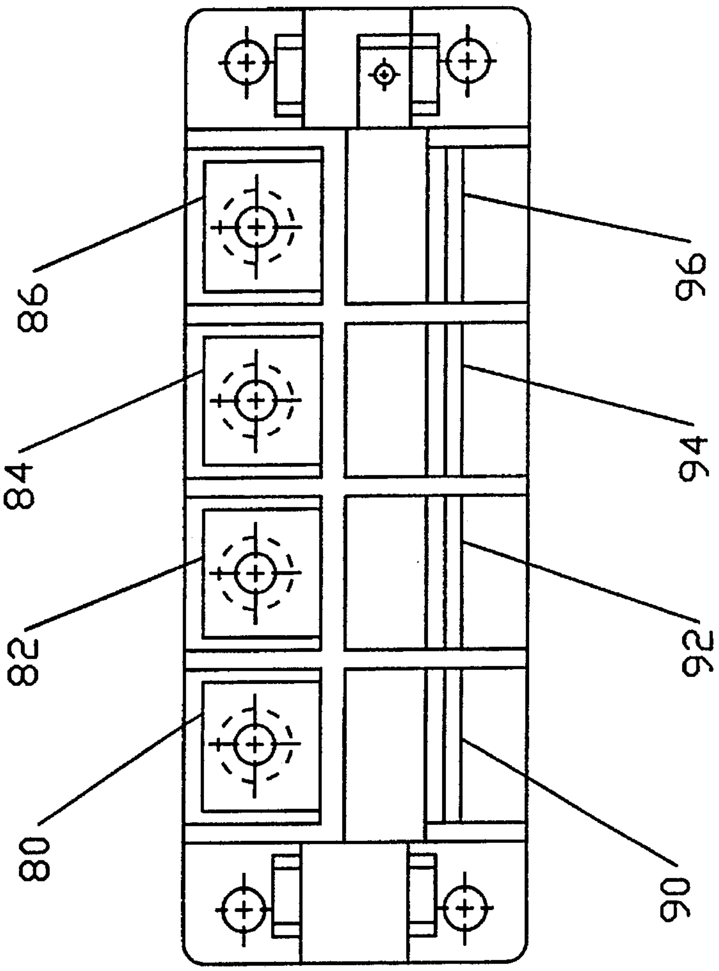
FIG. 9 is a bottom view of the base unit of FIG. 6 showing four line side bus bar contacts.
Figure 8:
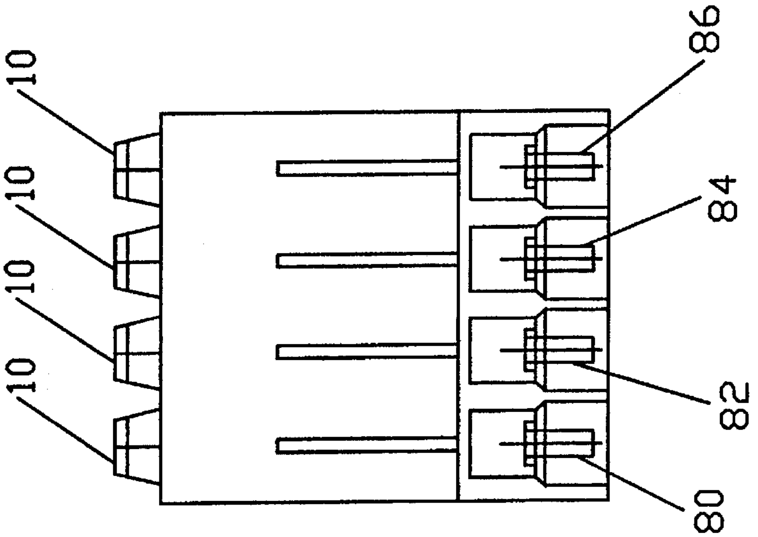
FIG. 8 is a side view of the base unit of FIG. 6 with four removable fuse holders inserted therein.

According to another exemplary embodiment of the present invention, elements of the power distribution panel for a telecommunication DC power frame and elements of a fused disconnect switch can be provided in a single package. This exemplary embodiment of the present invention is illustrated in FIGS. 6 through 9. In FIG. 6, a housing 70 can hold a plurality of removable fuse holders 10 (only one of which is shown in FIG. 6 in its inserted position). The housing is attached to a base unit 72 in which a unit line side bus bar/line connection terminal 74 distributes power to several load side terminals through the fuse holders 10 via connections 78 as may be understood by reference to FIG. 9. Although four load side terminals 80, 82, 84 and 86 and four line side contacts 90, 92, 94 and 96,are shown in the exemplary embodiment illustrated in FIGS. 6 through 9, those skilled in the art will readily appreciate that any number of terminals and corresponding disconnect devices 10 can be provided, e.g., eight terminals.

Each load side terminal contains fused circuit protection, in this exemplary embodiment, by way of the removable fuse holder 10 which is described in more detail above. The alarm contact 50 of each removable fuse holder 10 provides an alarm signal as described in the previous exemplary embodiment, but is now attached to a unit alarm bus 76 which provides an alarm indication in the event that a load side fault occurs.

Figure 7:
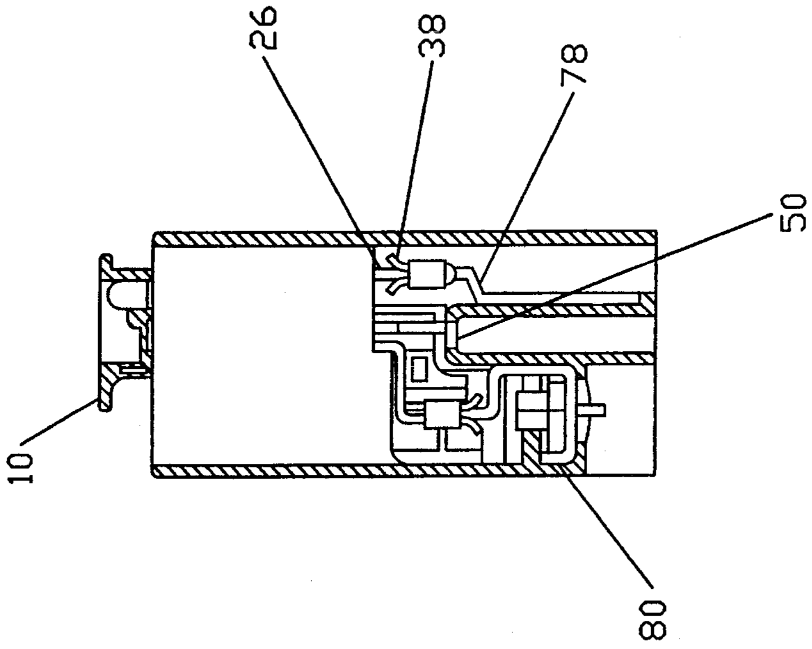
FIG. 7 is a cutaway view of the base unit of FIG. 6 with a removable fuse holder inserted therein.

As best seen in the cut-away view of FIG. 7, the removable fuse holders 10 can be readily removed and inserted into the housing without adapters in direct connection with the load and line buses. This ease-of-use feature of the present invention for this exemplary embodiment having multiple removable fuse holders is facilitated by, for example, the shape and positioning of the blade contact 26 relative to the removable fuse holder 10. As illustrated in FIG. 7, each blade contact 26 can be inserted into a corresponding contact 38, with a plurality of these contacts extending in a line across the housing 70.

By way of the present invention, the provision of common line and alarm buses eliminates additional parts which are conventionally required to carry current in telecommunication systems where power is distributed via individual bus bars and individual load circuit protection devices. This is both cost-effective and, by reducing the number of connections involved, provides a reduction in the number of potential failure points in the system. This type of modular construction also saves material and labor at an installer's site.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A fused disconnect device comprising:

a housing having an opening at a top thereof, a line side contact and a load side contact;

a removable fuse holder which is insertable into said opening having means for holding at least one fuse and having line and load side contact which mate with said line and load side contacts of said housing when said removable fuse holder is inserted in said housing to form a device circuit;

an alarm circuit for indicating that; a fuse in said fuse holder is in an interrupt condition including a bipolar LED in a top, handle portion of said removable fuse holder, and a deflectable tab for electably connecting said alarm circuit to the device circuit, wherein said removable fuse holder has an access opening positioned over said deflectable tab;

wherein said removable fuse holder has a viewing opening disposed over an end of said fuse so that the presence of a fuse can be visually verified when said removable fuse holder is inserted into said housing; and wherein said line side contact of said removable fuse holder includes a blade which defines a first plane that is substantially parallel to a second plane defined by a removal direction of said removable fuse holder and a line perpendicular to said removal direction.

2. The fused disconnect device of claim 1 further comprising: a light pipe disposed in said viewing opening.

3. The disconnect device of claim 1, wherein said second plane is also substantially parallel to a side of said housing.

4. The fused disconnect device of claim 1, wherein the alarm circuit is electrically isolated from the device circuit and is electrically connectable to the device circuit by one of the deflectable tab and a fuse in an interrupt condition.

5. A fused disconnect device comprising:

a housing having a rectangular opening at a top thereof;

a removable fuse holder which is insertable into said rectangular opening and having means for holding at least one fuse, wherein when inserted, said fuse holder and said housing form a device circuit; and an alarm circuit for indicating that a fuse held in said fuse holding means is in an interrupt condition including a bipolar LED in a top, handle portion of said removable fuse holder, wherein said alarm circuit is electrically isolated from said device circuit until a fuse in said fuse holding means is in an interrupt condition.

6. A fused disconnect device comprising:

a housing having a rectangular opening at a top thereof;

a removable fuse holder insertable into said rectangular opening and having means for holding at least one fuse, said fuse holder when inserted forming a device circuit with said housing; and an alarm circuit for indicating whether a fuse in said fuse holder has blown including a deflectable tab for connecting said alarm circuit to said device circuit for testing said alarm circuit, wherein said removable fuse holder has an opening positioned over said deflectable tab for access thereto.

7. A fused disconnect device comprising:

a housing having a rectangular opening at a top thereof;

a removable fuse holder insertable into said rectangular opening and having means for holding at least one fuse; and an opening in said removable fuse holder disposed over an end of said fuse holding means so that the presence of said fuse can be visually verified when said removable fuse holder is inserted into said housing.

8. The fused disconnect device of claim 7 further comprising:

a light pipe connected to said opening.

9. A disconnect device comprising:

a housing having a line side contact and a load side contact on a bottom portion thereof and a rectangular opening at a top portion thereof;

a removable fuse holder insertable into said rectangular opening having means for holding at least one fuse and having line side and load side contacts which mate with said line and load side contacts of said housing upon insertion of the fuse holder in the housing; and wherein said line side contact of said removable fuse holder includes a blade which defines a first plane that is substantially parallel to a second plane defined by a removal direction of said removable fuse holder and a line both perpendicular to said removal direction and parallel with a width of said fuse holder.

10. The disconnect device of claim 9, wherein said second plate is also substantially parallel to a side of said housing.

11. A fused disconnect device comprising:

a housing having a plurality of openings at a top thereof, a line side bus and a plurality of load side terminals;

at least one removable fuse holder insertable into any one of said openings having fuse holding means and having line and load side contacts which are electrically connected to said line side bus and one of said load side terminals of said housing upon insertion into an opening;

an alarm circuit for indicating whether a fuse in said fuse holding means is in an interrupt condition including a bipolar LED in a top, handle portion of said removable fuse holder, said alarm circuit being electrically connected to said fuse holding means by a fuse in a circuit interrupting state, said alarm circuit being connected to a common alarm bus and having a deflectable tab for selectably connecting said alarm circuit to said fuse holder for testing said alarm circuit, wherein said removable fuse holder has an access opening positioned over said deflectable tab;

wherein said removable fuse holder has a viewing opening disposed over an end of said fuse holding means so that the presence of said fuse can be visually verified when said removable fuse holder is inserted into said housing; and wherein said line side contact of said removable fuse holder includes a blade which defines a first plane that is substantially parallel to a second plane defined by a removal direction of said removable fuse holder and a line perpendicular to said removal direction.

12. A fused disconnect device comprising:

a housing having a plurality of fuse holder compartments including openings for inserting removable fuse holders at a top thereof, a line side bus and a plurality of load side terminals; and said line side bus bar having a plurality of line side contacts, each line side contact associated with a fuse holder compartment, wherein said line side contacts are disposed in a common line and are adapted to receive a blade-shaped contact of a removable fuse holder.

13. The fused disconnect device of claim 12, further comprising:

at least one removable fuse holder inserted into at least one of said openings, having fuse holding means and having line and load side contacts which mate with said line and load side contacts of said housing to form a device circuit when said removable fuse holder is inserted into said housing, said line side contact being blade-shaped and defining a first plane that is substantially parallel to a second plane defined by a removal direction of said removable fuse holder and a line perpendicular to said removal direction.

14. The fused disconnect device of claim 12, further comprising:

an alarm circuit for indicating whether a fuse in said fuse holding means is in an interrupt condition including a bipolar LED in a top, handle portion of said removable fuse holder and a common alarm bus disposed in said housing and connected to said alarm circuit of said at least one removable fuse holder which is inserted into said housing, wherein said alarm circuit is connectable to said device circuit by a fuse in interrupt condition whereby an alarm signal generated by an alarm circuit of any of said at least one removable fuse holders will identify said housing.

* * * * *